United States Patent
Karpyuk et al.

(10) Patent No.: US 11,959,192 B2
(45) Date of Patent: Apr. 16, 2024

(54) METHOD FOR PRODUCING NON-CORE BETA SILICON CARBIDE FIBERS

(71) Applicant: BOCHVAR HIGH-TECHNOLOGY RESEARCH INSTITUTE FOR INORGANIC MATERIALS, Moscow (RU)

(72) Inventors: Leonid Aleksandrovich Karpyuk, Moscow (RU); Vladislav Konstantinovich Orlov, Moscow (RU); Sergey Igorevich Ivanov, Moscow (RU); Alexey Vladimirovich Glebov, Moscow (RU); Fyodor Viktorovich Makarov, Putilkovo Village (RU); Roman Gennadyevich Zakharov, Moscow (RU); Ivan Alexandrovich Dzyubinsky, Moscow (RU); Alexander Pavlovich Ponomarenko, Moscow (RU); Dmitry Vladimirovich Zhigalov, Moscow (RU); Alexander Pavlovich Korolev, Moscow (RU); Artem Andreevich Vorobyov, Moscow (RU)

(73) Assignee: BOCHVAR HIGH-TECH. RES. INST. FOR INORG. MATERIALS, Moscow (RU)

( * ) Notice: Subject to any disclaimer, the term of this patent is extended or adjusted under 35 U.S.C. 154(b) by 310 days.

(21) Appl. No.: 17/620,732

(22) PCT Filed: Dec. 29, 2020

(86) PCT No.: PCT/RU2020/000772
§ 371 (c)(1),
(2) Date: Dec. 19, 2021

(87) PCT Pub. No.: WO2022/108475
PCT Pub. Date: May 27, 2022

(65) Prior Publication Data
US 2023/0026460 A1    Jan. 26, 2023

(30) Foreign Application Priority Data

Nov. 17, 2020  (RU) .......................... RU2020137624

(51) Int. Cl.
*D01D 5/088*    (2006.01)
*C01B 32/977*   (2017.01)
*D01F 9/08*     (2006.01)

(52) U.S. Cl.
CPC .......... *D01D 5/088* (2013.01); *C01B 32/977* (2017.08); *D01F 9/08* (2013.01)

(58) Field of Classification Search
CPC .............. D10B 2101/16; C04B 35/571; C04B 35/62281; C04B 2235/483;
(Continued)

(56) References Cited

U.S. PATENT DOCUMENTS

| 2011/0212329 A1 | 9/2011 | Pope et al. |
| 2018/0002829 A1 | 1/2018 | Greulich-Weber |

FOREIGN PATENT DOCUMENTS

| CN | 109456065 A | 3/2019 | |
| CN | 111900411 A * | 11/2020 | ............. B82Y 30/00 |

(Continued)

*Primary Examiner* — Seyed Masoud Malekzadeh
*Assistant Examiner* — Xinwen Ye
(74) *Attorney, Agent, or Firm* — Craft Chu PLLC; Andrew W. Chu

(57) ABSTRACT

The method for producing non-core beta silicon carbide fibers includes four steps. The first step is spinning of multifilament polymeric fiber by melt-extrusion of polycarbosilane. The second step is thermooxidative cross-linking for which the produced spun polymeric fibers are cured in an oxidation furnace at a temperature of 175-250 degrees C. at a heating rate of 3-10 degrees C./h until their weight is increased by 6-15%. The third step is carbonization of the produced cured polymeric fibers with the conversion into the ceramic phase. The fourth step is finishing of the produced (Continued)

beta silicon carbide fiber. The effect of the invention is producing non-core silicon carbide fibers, improving their strength performance, improving resistance to high temperatures and their high creep resistance, stable fiber properties, optimal average diameter of fibers, absence of foreign impurities in the fiber composition.

8 Claims, 13 Drawing Sheets

(58) Field of Classification Search
CPC .. C04B 2235/5244; B29C 48/05; D01D 4/02; D01D 4/022; D02D 4/025
See application file for complete search history.

(56) References Cited

FOREIGN PATENT DOCUMENTS

| | | | |
|---|---|---|---|
| JP | 2019137935 A | 8/2019 | |
| KR | 101781423 B1 * | 10/2017 | ............. D01D 10/02 |
| RU | 2427673 C1 | 8/2011 | |
| RU | 2535537 C1 | 12/2014 | |
| RU | 2694340 C1 | 7/2019 | |

* cited by examiner

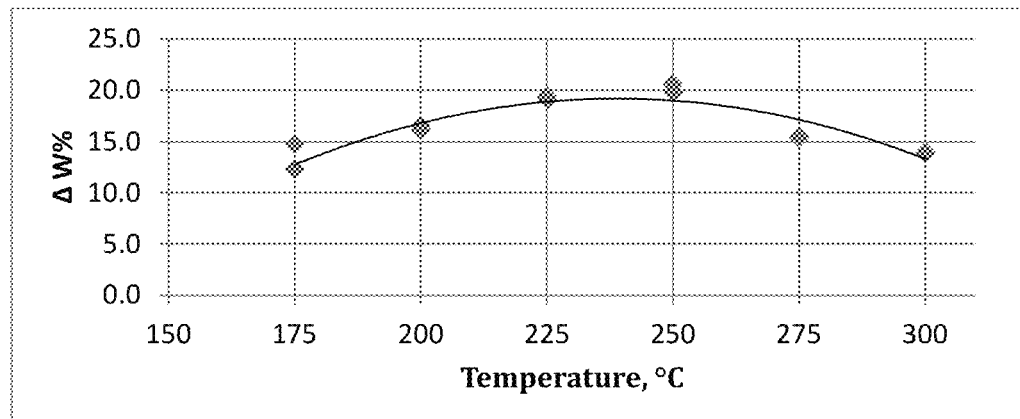
FIG. 1
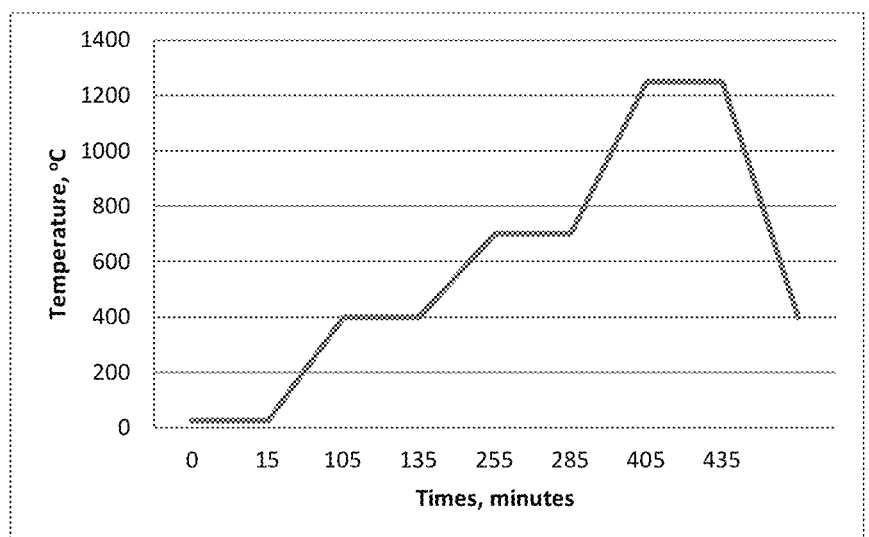
FIG. 2
| Sample | $T_1$ | $T_2$ | $T_{g.f.}$ | $T_3$ |
|---|---|---|---|---|
| 1 | 200 | 220 | 250 | 280 |
| 2 | 170 | 220 | 250 | 280 |
| 3 | 180 | 200 | 240 | 290 |
FIG. 3

FIG. 8
FIG. 9
| Sample | Melt temperature, °C | Rate, rpm | | | Pressure, MPa | | Viscosity, Pa•s | Shear rate, | Shear stress, MPa |
|---|---|---|---|---|---|---|---|---|---|
| | | of gear pump | of winding in fiber winding device | of handler in fiber distributing device | extruder | spinneret | | | |
| 1 | 250 | 6 | 440 | 52 | 5 | 3.00 | 459.9 | 815.2 | 375 |
| 2 | 250 | 12 | 798 | 33 | 6 | 1.84 | 141.0 | 1630.5 | 230 |
| 3 | 240 | 4 | 550 | 30 | 6 | 4.00 | 919.9 | 543.5 | 500 |
FIG. 10

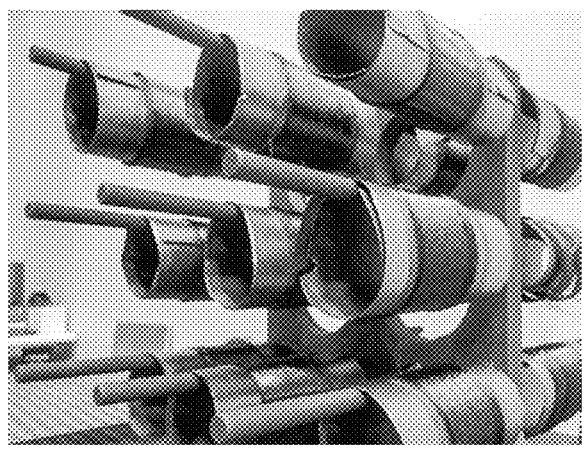
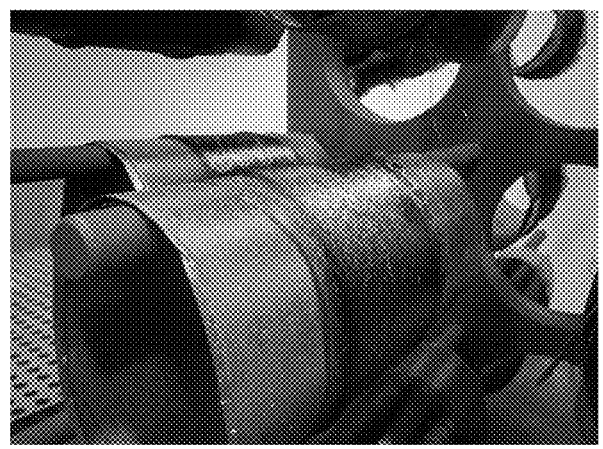
FIG. 14      FIG. 15
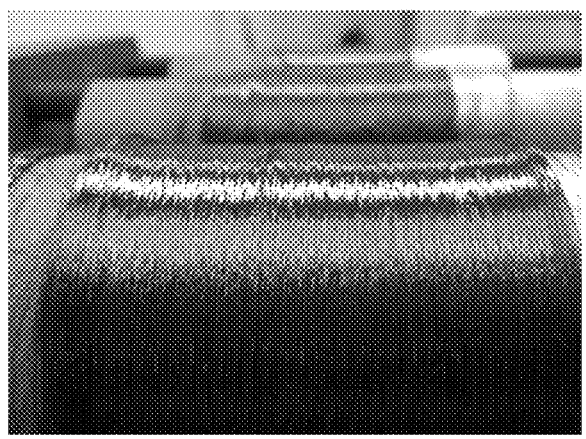
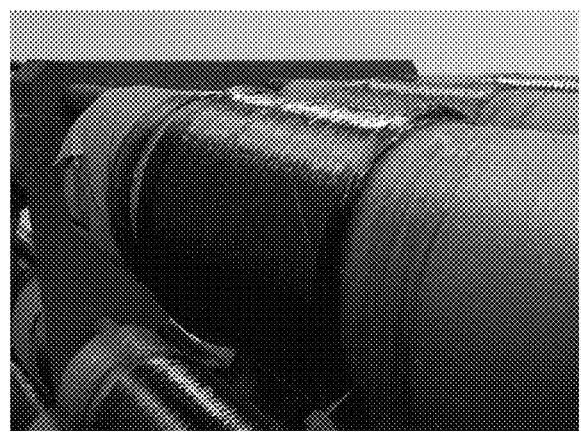
FIG. 16      FIG. 17
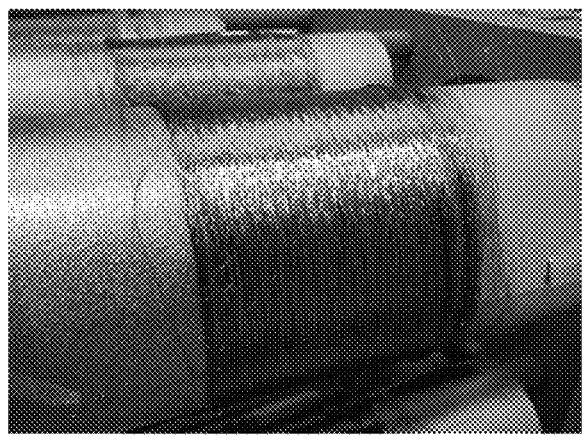
FIG. 18      FIG. 19

| Sample (bobbin) No. | 1 | 2 | 3 |
|---|---|---|---|
| Monofilament diameter, μm | 13 | 15 | 14 |
| Filament number in bundle, pcs. | 500 | 200 | 250 |
| Maximum load, gs | 41.32 | 30.53 | 26.64 |
| Maximum tensile elongation, mm | 0.27 | 0.27 | 0.22 |
| Maximum tensile deformation, % | 1.1 | 1.1 | 0.9 |
| Stress at maximum load, MPa | 2632.61 | 2255.62 | 1968.48 |
| Strength, MPa | 2684.51 | 2300.1 | 2007.29 |
| Modulus of elasticity, GPa | 244.05 | 209.1 | 223.03 |
*FIG. 32*
*FIG. 33*
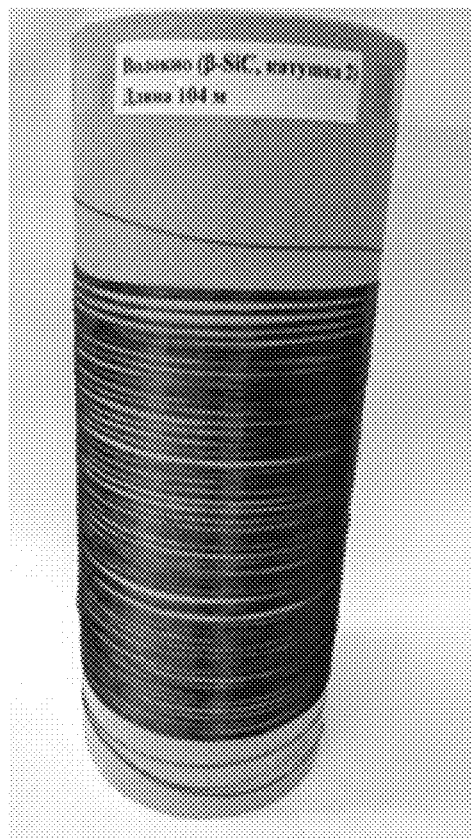
*FIG. 34*

METHOD FOR PRODUCING NON-CORE BETA SILICON CARBIDE FIBERS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to the field of chemical industry, in particular to a method for producing non-core beta silicon carbide ($\beta$-SiC) fibers. Non-core silicon carbide fibers may be used in nuclear power engineering, aerospace engineering and other hi-tech industries.

2. Description of Related Art Including Information Disclosed Under 37 CFR 1.97 and 37 CFR 1.98

The prior art discloses a method for producing textile silicon carbide materials (Patent RU 2694340, IPC C01B 32/956, C01B 32/97, publ. 11 Jul. 2019) by silicifying thermal treatment of carbon fiber precursors in SiO gas atmosphere. Silicifying thermal treatment of carbon fiber precursors is carried out in a batch reactor containing a material that generates SiO gas when heated; the thermal treatment is carried out in conditions of continuous vacuum evacuation of gaseous products at a temperature of 1350-1650° C. with curing for 60-600 minutes. A temperature rise rate during heating in the range from 1300° C. to the temperature of silicifying treatment is 0.2 to 6.0° C./min.

A shortcoming of this invention is instability of fiber properties due to non-stoichiometric multiphase composition.

A device and a method for continuous production of qualitatively high-grade crystalline silicon carbide, in particular in the form of nanocrystalline fibre are known in the art (Patent US 2018002829, IPC C23C 16/32, C30B 25/00, C30B 29/36, C30B 29/66, publ. 4 Apr. 2018). The method comprises the steps of: a) feeding a precursor mixture including a silicon source, a carbon source and, optionally, a doping agent into a reactor; b) exposing the precursor mixture provided in step a) to a gasification temperature in a reactor; c) depositing crystalline silicon carbide on a substrate by adjusting a crystallization temperature on the substrate; d) moving the substrate to a scraper; and e) transferring the silicon carbide produced into a collection container by removing the silicon carbide produced from the substrate by moving the substrate along the scraper.

Shortcomings of this invention are instability of fiber due to non-stoichiometric multiphase composition of the produced crystalline silicon carbide and impossibility of producing continuous non-core SiC fibers under the described conditions of production.

A spinning solution for electrospinning, a method for producing fibers by electrospinning, and silicon carbide fibers are known in the art (Patent RU 2427673, IPC D01D 1/02, D01D 5/00, publ. 27 Aug. 2011). The invention relates to a technology for producing silicon carbide fibers. The spinning solution for electrospinning of a polymeric precursor of silicon carbide fibers comprises 50-70% polycarbosilane having an average molecular weight in the range from 800 to 1500 AUM, a cross-linking agent and a photoinitiator, the molar ratio of the components being: polycarbosilane/cross-linking agent/photoinitiator=1/(0.5–1.5)/(0.5–2). The method for producing silicon carbide fiber comprises the steps of: preparing a spinning solution, electrospinning fibers of silicon carbon precursor from the spinning solution while simultaneously cross-linking the precursor fibers by irradiating with light in the visible or UF-radiation range, and thermally treating the precursor fibers for converting them into silicon carbide fibers. Silicon carbide fibers, produced according to this method, have an average diameter from 50 nm to 2 µm and porosity less than 10 m$^2$/g.

A shortcoming of this invention is a low average diameter of silicon carbide fibers produced according to this method and the impossibility of producing long and continuous non-core SiC fibers under the described production conditions.

Stoichiometric silicon carbide fibers from thermo-chemically cured polysilazanes are known in the art (Patent US 2011212329, IPC C01B 31/36, publ. 1 Sep. 2011). Polycrystalline stoichiometric fine SiC fiber substantially free of impurities is produced using a pre-ceramic polymer. The pre-ceramic polymer is prepared by reacting a mixture of chlorodisilane, boron trichloride, and a vynil chlorodisilane with an excess of hexamethyldisilazane to form a ceramic polymer resin, which then may be melt-spun, cured, pyrolyzed and heat-treated to obtain the finished SiC fiber.

Shortcomings of this invention are insufficient strength performance of silicon carbide fibers and a complex procedure of preparing a carbon fiber precursor used.

The closest prior art, which is taken as a prototype, is a method for producing a silicon carbide fiber (Patent JP 2019137935, IPC C01 B 32/977, D01 F 9/10, publ. 22 Aug. 2019), comprising: the step of producing polycarbosilane, the step of dry spinning for producing polycarbosilane in the fiber form, and the firing step for producing the silicon carbide fiber from the polycarbosilane fiber. The produced silicon carbide fiber is inexpensive and has a diameter of 10 µm or less.

A shortcoming of the prototype is the presence of hydrogen impurity in the fiber composition due to the involvement of gaseous hydrogen in the fiber carbonization process.

BRIEF SUMMARY OF THE INVENTION

The technical effect of the present invention is the possibility of producing continuous non-core silicon carbide fibers, improvement in their strength performance, improvement in resistance to high temperatures, high creep resistance, stability of fiber properties, an optimal average diameter of fibers, simplification of a procedure of preparing a carbon fiber precursor used, absence of foreign impurities in the fiber composition.

The method for producing non-core beta silicon carbide fibers, according to the invention, comprises successive steps of spinning fibers from a melt of a fiber-forming organosilicon polymer, thermochemical oxidative cross-linking, carbonizing and finishing the fibers.

BRIEF DESCRIPTION OF THE SEVERAL VIEWS OF THE DRAWINGS

The invention is illustrated by the following graphic materials.

FIG. 1 shows a graph illustration of changing a polycarbosilane (PCS) fiber weight under various conditions of thermooxidative cross-linking.

FIG. 2 shows a graph illustration of a typical program of PCS-fiber carbonization.

FIG. 3 shows a table illustration depicting PCS temperature performance determined before the spinning process.

FIG. 8 and FIG. 9 show photo illustrations of bobbins with polymeric fiber made from PCS.

FIG. 10 shows a table illustration depicting main parameters of fiber extrusion at the extrusion and spinning assembly.

FIGS. 14-19 show photo illustrations of β-SiC fiber appearance.

FIG. 32 shows a table illustration depicting characteristics of a β-SiC fiber pilot batch.

FIG. 33 and FIG. 34 show photo illustrations of a pilot batch of non-core β-SiC fiber.

DETAILED DESCRIPTION OF THE INVENTION

Figure 4:
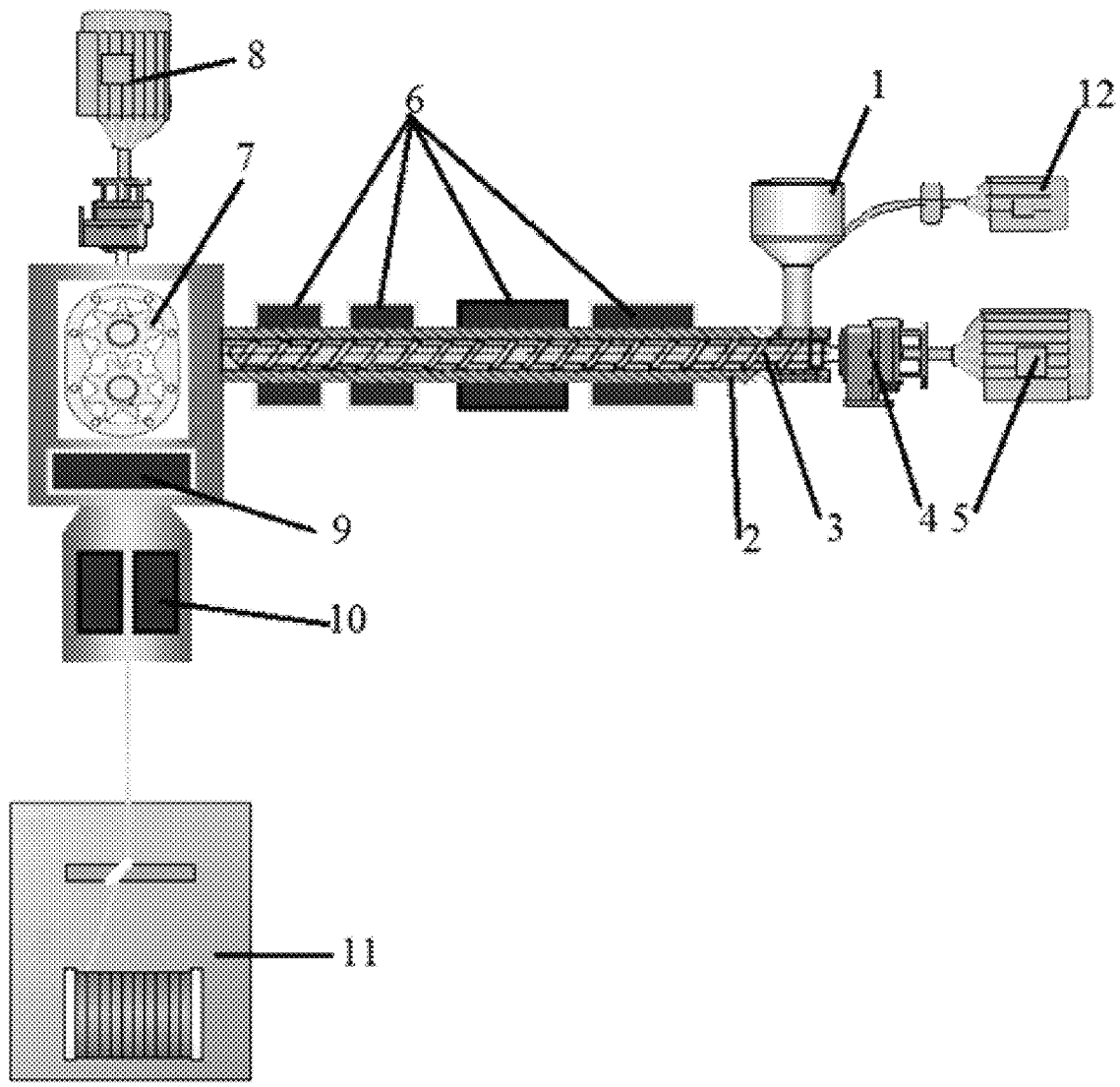
FIG. 4 shows a schematic view of an extrusion and spinning assembly for spinning multifilament polymeric fiber from PCS, where: 1—feed bin; 2—material cylinder; 3—screw; 4—sleeve; 5—extruder drive; 6—heating elements; 7—gear pump; 8—gear pump drive; 9—spinneret set; 10—under-spinneret furnace; 11—fiber winding device; 12—vacuum pump.

The production of high-melting non-core silicon carbide fibers consists in spinning fibers from a melt of fiber-forming organosilicon polymer, followed by curing, pyrolysis and obtaining of a SiC filament.

The key feature of non-core SiC fibers is their ultrafine microstructure that imparts high tensile strength. Their creep and thermal resistance are mainly determined by stoichiometry and, in particular, by oxygen content. Therefore, non-core silicon carbide fibers with a reduced oxygen content have better stability at high temperatures and a higher creep resistance.

The essence of the invention is that for the purpose of producing non-core beta silicon carbide fibers multifilament polymer fibers are formed by extrusion from a melt of a fiber-forming organosilicon polymer, and the obtained cured polymeric fibers are subjected to thermal oxidative cross-linking and carbonization to produce non-core beta silicon carbide fibers, and to finishing beta silicon carbide fibers.

Polycarbosilane (PCS) with methyl substitutes and methylene bridges—poly(oligo)dimethylsilylenemethylenes—is selected as the fiber-forming organosilicon polymer, since after their pyrolysis silicon carbide that is closest to stoichiometric composition is formed. A major part of excess carbon from side methyl groups is removed during the process of pyrolysis and does not enter ceramics.

In order to achieve a continuous and stable process of producing non-core ceramic fibers, it is necessary that an organosilicon polymer has a relative (number-average) molecular weight of ~1000-2500 and suitable viscoelastic properties for providing stable spinning and stretching fibers without breakage.

A suitable starting material for synthesis of PCS is polydimethylsilane, since it has the suitable stoichiometric ratio Si:C (2:1), is economically affordable, does not contain oxygen that negatively affects properties of a finished product, and a decomposition reaction proceeds comparatively quickly without any catalysts.

The first step of the method is spinning amorphous multifilament polymeric fibers by extrusion from a melt of a fiber-forming organosilicon polymer, polycarbosilane is selected as the polymer.

Extrusion is a method and process of producing various products from polymeric materials by forcing a material through a forming orifice—a spinneret. The equipment required for this method is an extruder. The main function of the extruder is to provide sufficient pressure in a material that enables to force such material through the extruder head.

An extrusion and spinning assembly for spinning non-core continuous silicon carbide fibers is operated in accordance with the following procedure:

1. A polymeric material in the form of lumps, pellets or chips is loaded into a hermetically sealed feed bin of the extruder, with the possibility of vacuuming and purging an inert gas;
2. The polymeric material is fed from the feed bin to a polymer melt preparation unit heated to a pre-selected temperature not higher than 400 C (an optimal spinning temperature is determined for selecting the temperature);

3. The prepared polymer melt is fed to a hermetically sealed fiber spinning assembly where an extrusion gear pump with controllable rotation speed, which is driven by an electric motor, forces, continuously and at a determined rate and pressure, the polymer melt to the extruder head (spinneret assembly), and the polymer melt, while distributing over the surface area of the spinneret, is forced through all orifices at a similar rate, which enables to produce a bundle of continuous fibers of a required length with pre-determined parameters of a number of filaments and a diameter of each filament;
4. The fiber bundle is cooled stepwise, followed by curing the fiber bundle produced in an inert atmosphere after it leaves the spinneret assembly—first, in a heated under-spinneret space, and then in the inert gas atmosphere until cooled to room temperature;
5. The cooled fiber bundle is received at the outlet of a cooling shaft and is winded onto bobbins.

An optimal spinning temperature (or so-called $T_{g.f.}$—good filament temperature) is selected on the basis of viscosity and temperature of polymer destruction. For each particular sample this temperature is slightly different. An optimal spinning temperature is selected on the basis of characteristic temperatures of a polymer: a temperature is selected in a range from a temperature higher than an initial fiber formation temperature ($T_2$) to a temperature lower than a drop temperature ($T_3$). The conducted tests show that an optimal spinning temperature is, on the average, higher by 30-40° C. than the initial fiber formation temperature ($T_2$). It may be noted that spinnability of a polymer is better at lower viscosity.

The spun polymeric fibers from the extrusion and spinning assembly is received by a special receiving apparatus comprising a fiber winding device and a fiber distributing device.

The operating speed of the handler in the fiber distributing device enables to alter an angle of fiber winding onto a bobbin, i.e. when the speed is lower and a winding angle is decreased, parallel winding is performed, and when the speed is higher and a winding angle is increased, cross winding is performed.

The winding rate in the fiber winding device may be adjusted from 1 to 1500 turns per minute, and in the present invention the winding rate is variable in the range from 400 to 800 turns per minute. It directly influences the under-spinneret stretching of the fiber and facilitates orientation stretching of PCS macromolecules. During spinning process, fibers are drawn from the spinneret due to the fact that a receiving speed is higher than a speed of feeding a melted polymer from the spinneret.

Thus, for carrying out the first step of the method, an initial fiber formation temperature and a drop temperature are determined in advance; then, at room temperature, polycarbosilane (in the form of lumps, pellets or chips with a size of |2-7 mm) is loaded to the extruder and heated to an optimal spinning temperature selected in a range from a temperature higher than an initial fiber formation temperature to a temperature lower than a drop temperature, thus producing a homogenous melt of polycarbosilane. The polycarbosilane melt is forced through the spinneret at a pressure from 1.5 to 4.0 MPa, and polymeric fibers are formed. These formed fibers are gradually cooled in an inert atmosphere to room temperature, followed by curing. The polymeric fibers are received by the fiber winding device having a winding rate higher than a feed speed of the polymeric fibers. As a result, the spun polymeric fibers are formed. Gaseous nitrogen or argon may be used, for example, as the inert atmosphere.

It should be noted that the spinning process is an important step in the production of quality polymeric fibers, since defects formed during spinning, such as beads, gas inclusions, subsequently pass into finished ceramic fiber, which affects, mostly negatively, its strength. The spinning parameters selected according to this invention enable to achieve an optimal flow of a melt—without gas formations (bubbles) in polymeric fibers, which will either remain in the fibers, or cause breaks; without extrudate sticking to the spinneret outer surface.

The second step of the method is thermooxidative cross-linking, i.e. curing (oxidation) in air at an elevated temperature according to the following scheme:

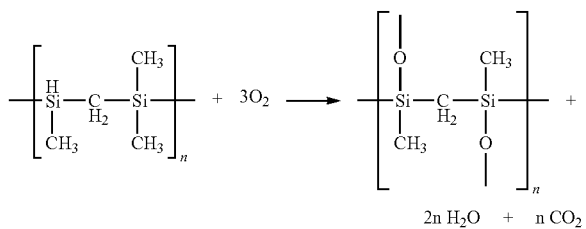

Polymer molecules are cross-linked due to oxidation of Si—H and Si—CH₃ groups and formation of new Si—O—Si and Si—O—C bonds. After that, a weight of fibers is increased, on the average, by 6-15%.

During studies for selecting optimal parameters of winding onto a graphite foil, individual fibers were cured in an oxidation furnace at temperatures up to 175-300° C., a heating rate being 3-10° C./h.

After studying the samples, it was determined that they obtained different elemental compositions due to different oxidation modes. Furthermore, changes in fiber weights, i.e. weight increases in different conditions, may be used for judging about a most effective temperature at which thermooxidative cross-linking takes place. It can be seen in FIG. 1 that these are temperatures below 250° C., since weight is reduced at higher temperatures and, as a consequence, destruction starts together with removal of low-molecular products.

Thus, an optimal temperature of thermooxidative cross-linking may be determined, selected in the range from 175 to 250° C. An optimal speed of heating is in the range from 3 to 10 C/h. Produced spun polymeric fibers, wound on graphite bobbins, are cured in an oxidation furnace at a selected temperature until their weight in increased by 6-15%.

The third step of the method is carbonization of the produced cured polymeric fibers and their conversion into the ceramic phase.

For this purpose, the cured polymeric fibers are treated in a high temperature furnace in an inert atmosphere or in vacuum with stepwise heating to 1100-1300° C. at a heating rate of 2.5-5° C./min. Gaseous nitrogen and/or argon may be used, for example, as the inert atmosphere.

The reaction proceeds according to the following scheme:

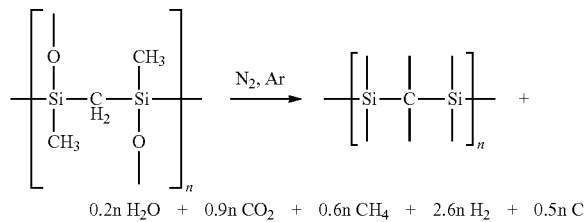

While doing so, the fibers are obligatorily held for 30 minutes at the temperatures of 400, 700 and 1250° C., since these temperatures correspond to intensive removal of low-molecular substances from the material. The carbonization program developed for PCS fibers is shown in FIG. 2.

Thus, the program of stepwise heating when PCS fibers are carbonized in a high-temperature vacuum furnace in accordance with the above requirements comprises the following steps:

Vacuumizing the furnace (to the level of 100 Pa);
Filling the furnace space with an inert gas (if necessary);
Heating to 400 degrees C. at a heating rate of 2.5-5 degrees C./min;
Holding at 400 degrees C. for 30 minutes;
Heating to 700 degrees C. at a heating rate of 2.5-5 degrees C./min;
Holding at 700 degrees C. for 30 minutes;
Heating to 1250 degrees C. at a heating rate of 2.5-5 degrees C./min;
Holding at 1250 degrees C. for 30 minutes; and
Cooling the furnace.

The total time of the production process, without time required for cooling the furnace, is app. 7 hours. This is a standard program. It is suitable for operating in vacuum and an inert atmosphere.

Then, the high-temperature furnace is cooled.

The fourth step of the method is finishing the produced beta silicon carbide fibers.

The finishing is performed for the purpose of improving processing characteristics of filaments and yarns: easing of processing procedures (e.g., weaving), protecting brittle fibers against mechanical damage in the course of processing, reducing the static characteristic. A finishing composition is, as a rule, an emulsion or suspension composed of polymeric components—emulsifiers, film-forming, antistatic and binding agents providing alignment and protection of fibers and improving their wettability.

In particular, a solution of a polyvinyl alcohol with distilled water may be selected as the finish. Polyvinyl alcohol is an excellent emulsifying, adhesive and film-forming polymer. It has a high tensile strength and flexibility.

When selecting a concentration of polyvinyl alcohol with distilled water, the following solution concentrations were used: 0.25%, 0.5%, 1%, and 3%. As a result of experiments conducted, it was established that the higher is the solution concentration, the more rigid and brittle a finished filament is. Therefore, the minimal concentration (0.25%) was selected that was optimal for applying the finish composition to β-SiC fibers.

Thus, one of the finishing variant is placement of silicon carbide fibers into a reservoir with a solution of polyvinyl alcohol with the concentration of 0.25%, followed by drying to achieve a constant weight.

Directly before a use of non-core beta silicon carbide fibers, the finish should be washed off. The advantage of this finish is that it may be easily removed from the fiber surface without using organic diluents. Namely, in order to remove the finish, non-core beta silicon carbide fibers are washed in warm water having a temperature in the range from 35 to 40 degrees C. and dried at the temperature of 600 degrees C. in air for 30 minutes.

The selection of this finish does not limit the invention, but is only one of possible embodiments.

Exemplary embodiments of the method for producing non-core beta silicon carbide fibers.

Example 1

Spinning of multifilament polymeric fiber, which is the first step of the method for producing non-core beta silicon carbide fibers, was carried out by a technique of polycarbosilane (PCS) extrusion.

Optimal processing temperatures for a PCS sample were determined in advance. As a result, the following data were obtained: softening temperature ($T_1$) 200 degrees C., initial fiber formation temperature ($T_2$) 220 degrees C. and drop temperature ($T_3$) 280 degrees C. The good filament temperature $T_{g.f.}$ (optimal spinning temperature) was selected so as it is 30 degrees C. higher than the initial fiber formation temperature −250 degrees C. Table in FIG. 3 shows temperature characteristics for Sample 1.

Then, the extruder (extrusion and spinning assembly) was switched on, and a mode of heating the operating parts was set with due regard to the optimal spinning temperature ($T_{g.f.}$) of 250 degrees C.

Figure 5:
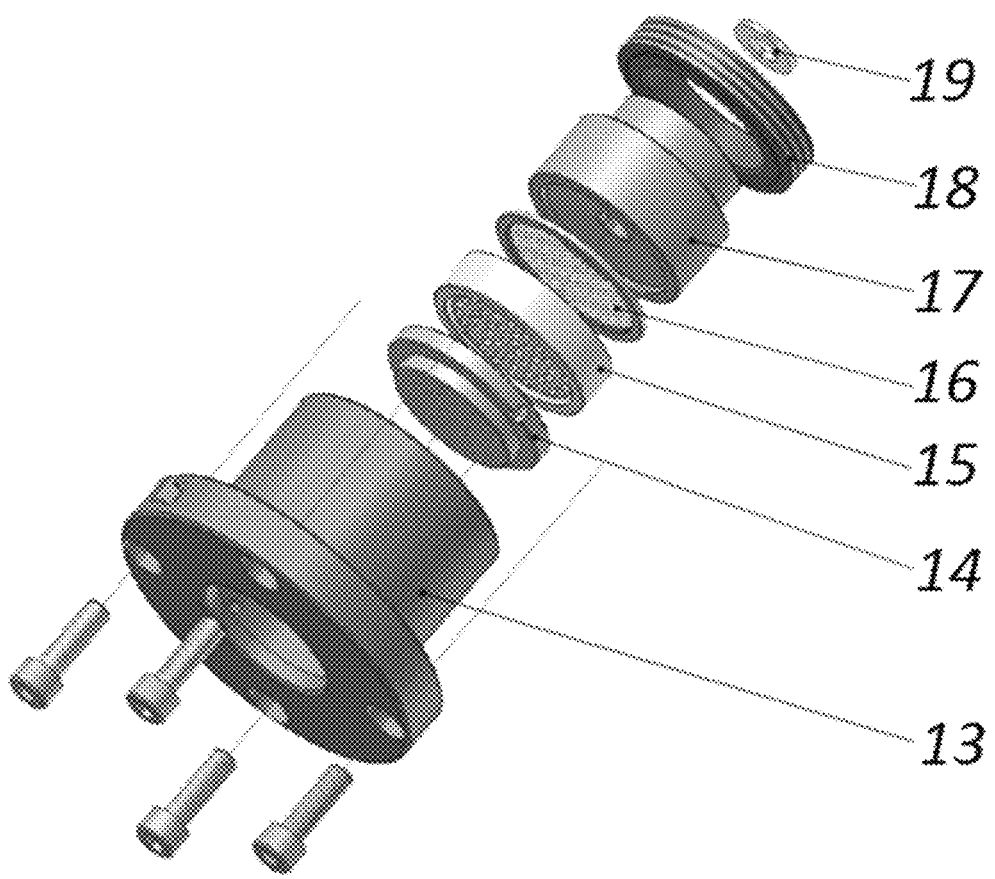
FIG. 5 shows an exploded perspective view of a layout of the spinneret set, where: 13—bowl (body); 14—spinneret; 15—perforated circular plate; 16—melt filter; 17—coupling; 18—nut; 19—spacer.

A schematic diagram of the extruder for spinning multifilament polymeric fibers from PCS is shown in FIG. 4. The extrusion and spinning assembly comprises a feed bin 1, a material cylinder 2, a screw 3, a sleeve 4, an extruder drive 5, heating elements 6, a gear pump 7, a gear pump drive 8, a spinneret set 9, an under-spinneret furnace 10, a fiber winding device 11, a vacuum pump 12. A schematic diagram of the spinneret set 9 is shown in FIG. 5. The spinneret set 9 comprises successively arranged coaxial constructive elements: a bowl (body) 13 in the form of a flange, a spinneret 14, a perforated circular plate 15, a melt filter 16, a coupling 17, a nut 18, a spacer 19. The number of orifices in the spinneret 14 used is 48. The capacity of the gear pump 7 is 0.6 cm³.

Figure 6:
FIG. 6 shows a photo illustration of PCS pellets.

PCS was taken in the form of pellets with sizes from 2 to 7 mm (FIG. 6) and loaded into the bin 1 (see FIG. 4), purged with an inert gas for preventing PCS from interacting with air oxygen; the bin 1 was vacuumized by means of a vacuum pump 12.

The polymeric material was fed from the feed bin 1 to the polymer melt preparation unit heated by means of the heating elements 6 to the temperature of 250 degrees C. The polymer melt preparation unit is composed of the material cylinder 2 and the screw 3 driven via the sleeve 4 by the electric drive of the extruder 5.

When heated, PCS pellets were converted into a PCS melt with viscosity of 459.9 Pa s.

Then, the prepared PCS melt was fed to the hermetically sealed, heated fiber spinning assembly where the gear pump 7 with controllable rotation rate that was driven by the electric motor of the gear pump drive 8 forced the PCS melt to the spinneret set 9 continuously at a rate of 6 rpm and pressure of 5 MPa. The PCS melt, while being distributed over the whole surface area of the spinneret 14, was forced through all 48 orifices at a similar rate and at pressure of 3.00 MPa, which resulted in formation of a bundle of continuous fibers.

Then, stepwise cooling was carried out, followed by curing the obtained fiber bundle in an inert atmosphere—gaseous nitrogen. First, cooling was carried out after the fiber bundle left the spinneret set 9 in the heated under-spinneret furnace 10 in an inert gas atmosphere, after that, in an inert gas atmosphere outside the under-spinneret furnace 10—to room temperature, and the cooled spun polymeric fiber was received by the fiber winding device 11.

The winding rate in the fiber winding device was 440 rpm, i.e. higher than the feed rate of melted polymeric fiber from the spinneret—6 rpm, in order to perform under-spinneret drawing of the fiber.

Figure 7:
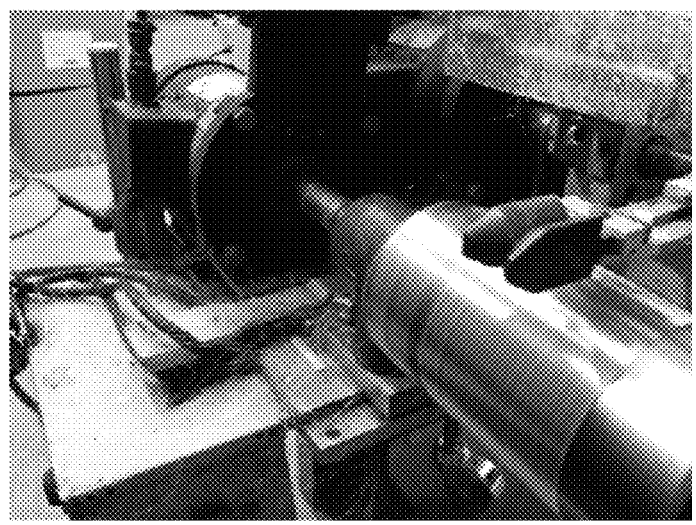
FIG. 7 shows a photo illustration of a receiving apparatus comprising a fiber winding device and a fiber distributing device.

The operating speed of the handler in the fiber distributing device, which was equal to 52 rpm, enabled to alter an angle of winding fiber onto a bobbin. The receiving apparatus comprising the fiber winding device and the fiber distributing device is shown in FIG. 7.

PCS samples showed excellent spinnability, were drawn into a fine continuous filament, extrusion was carried out without pressure surges, no gas inclusions were observed in the extrudate.

As a result, a batch of PCS polymeric fibers was produced; they were brittle fibers of white color with the thickness of 25 μm. The produced batch of PCS fibers is shown in FIGS. 8 and 9. After spinning, the fibers wound onto graphite bobbins were weighed on an analytical balance.

The Table in FIG. 10 shows the main parameters of fiber extrusion in the extrusion and spinning assembly, Sample 1.

Then, the second step of the method was carried out, namely, the polymeric fibers were subjected to thermochemical cross-linking—curing (oxidation) in air at the temperature of 175 degrees C., the heating rate being 3° C./h.

Polymeric molecules were cross-linked due to oxidation of Si—H and Si—$CH_3$ groups and formation of new Si—O—Si and Si—O—C bonds.

The fibers obtained yellow tint, their weight increased by 6%, on the average.

Figure 11:
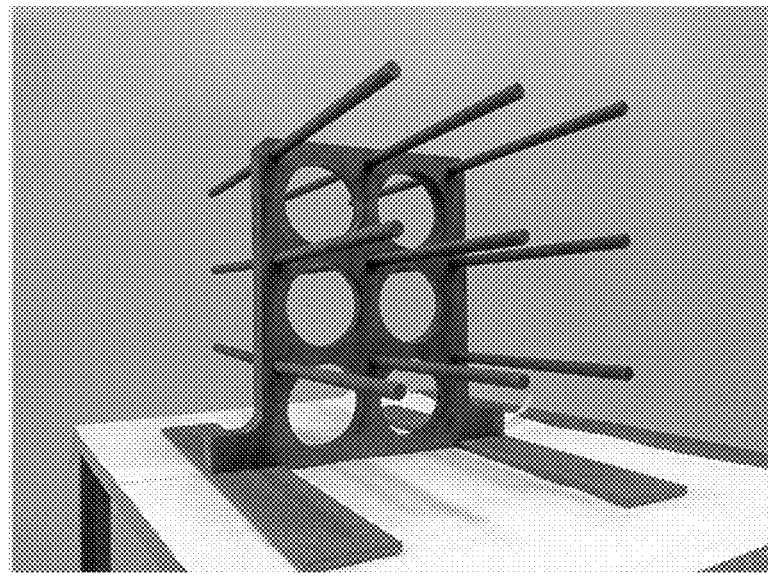
FIG. 11 shows a photo illustration of a graphite bobbin carrier.

After conducting the oxidation process, the fibers wound onto graphite bobbins were weighed on an analytical balance and placed on a special bobbin carrier made of graphite. FIG. 11 shows the graphite bobbin carrier.

In order to carry out the third step of the method, the cured PCS polymeric fiber was converted into a ceramic phase, i.e. the sample was carbonized. To do this, it was treated in a high temperature vacuum furnace with stepwise heating to 1100-1300° C. in an inert atmosphere (gaseous N2 and Ar).

Figure 12:
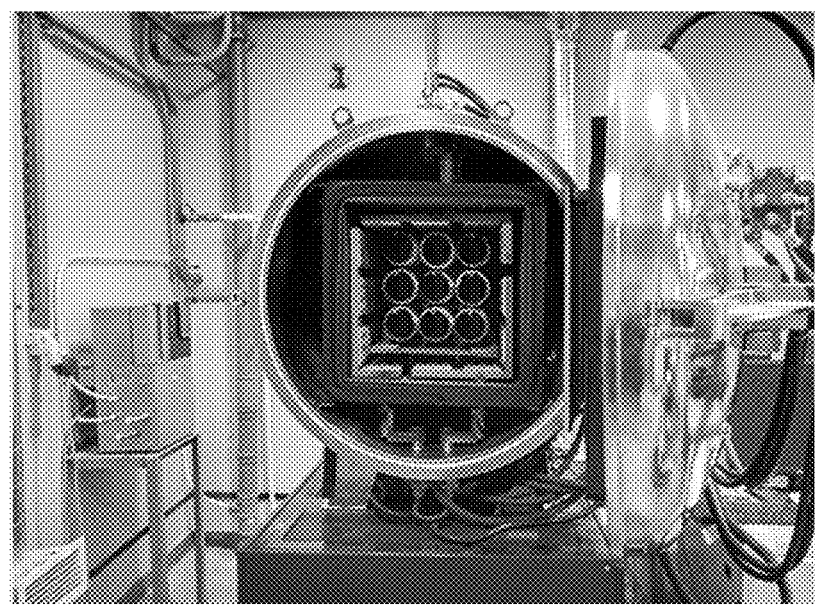
FIG. 12 shows a photo illustration of fibers prepared for carbonization.

The bobbin carrier was placed into a carbonization furnace, as shown in FIG. 12, the furnace was closed and vacuumized. Then, the furnace was filled with an inert gas, and the carbonization process of the PCS fiber was carried out with stepwise heating according to the program comprising the following steps:

Vacuumizing the furnace (to the level of 100 Pa);
Filling the furnace space with an inert gas;
Heating to 400 degrees C. at a heating rate of 4.4 C/min; 2.5-5 degrees C./min;
Holding at 400 degrees C. (30 minutes);
Heating to 700 degrees C. at a heating rate of 2.5 degrees C./min; 2.5-5 degrees C./min;
Holding at 700 degrees C. (30 minutes);
Heating to 1250 degrees C. at a heating rate of 4.5 degrees C./min; 2.5-5 degrees C./min;
Holding at 1250 degrees C. (30 minutes); and
Cooling the furnace.

This program is shown in FIG. 2.

Figure 13:
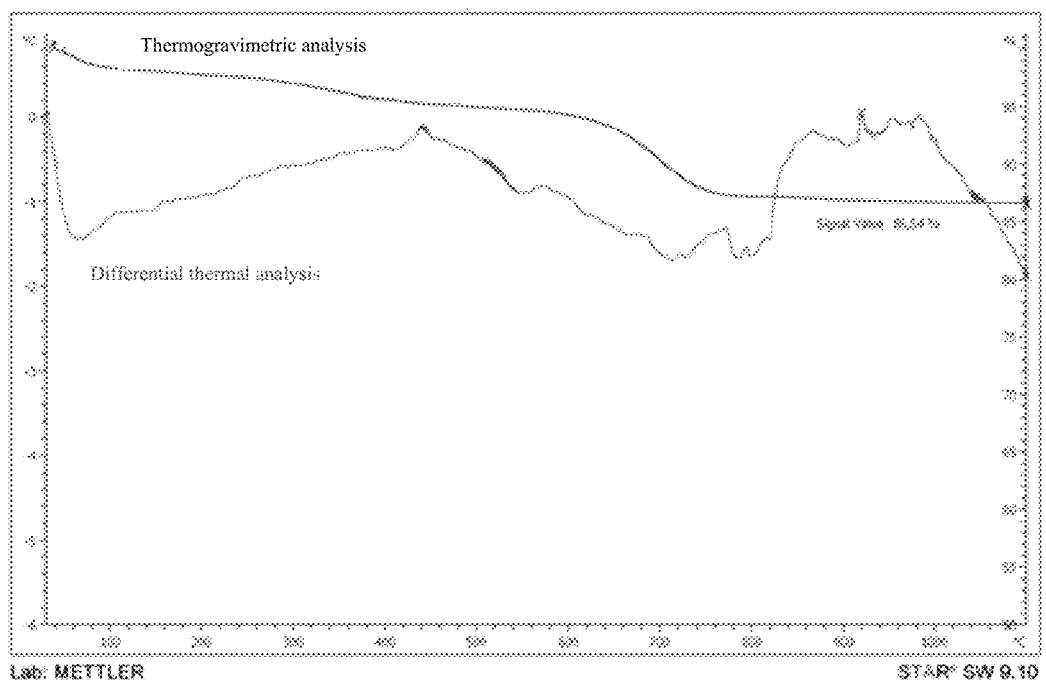
FIG. 13 shows a graph illustration of a thermogravimetric analysis (TGA) of oxidized fiber.

The TGA data on the oxidized fiber, proving the selection of the program temperature parameters, is shown in FIG. 13.

Photographs of the β-SiC fiber after the carbonization process are shown in FIGS. 14-19.

The formed beta silicon carbide fibers had a thickness of 15-22 μm. After carbonization, the fibers obtained black color, glossy surface, a significant shrinkage became visible (up to 25%), color tints of blue and brown colors were observed.

The process of producing silicon carbide fibers in the fourth, final, step includes finishing. As the finish, a solution of polyvinyl alcohol with distilled water was taken with the concentration of 0.25%.

Figure 20:
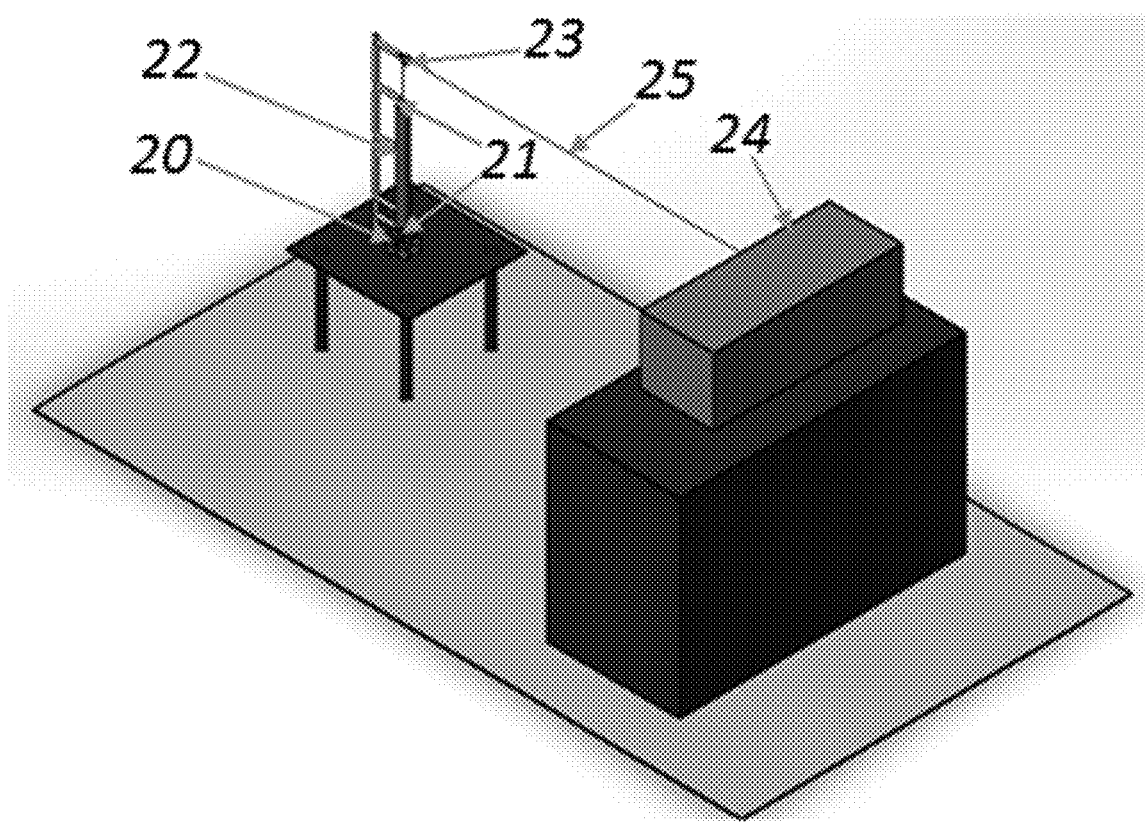
FIG. 20 shows a schematic view of a diagram of applying a finish to β-SiC fiber, where: 20—bowls with the finish and β-SiC fiber bundles; 21—hook; 22—furnace; 23—roll; 24—winding device; 25—finished filament.

The finish was applied in accordance with the technique shown in FIG. 20. A β-SiC fiber skein without a bobbin was placed in a bowl 20 with the finish and a bundle was unwound from the inside (from its center). The bundle was passed through a guide hook 21 into a furnace 22 for drying the finish. When leaving the furnace, the bundle went round a roller 23, and a finished β-SiC multifilament thread with the finish 25 was wound on a winding device 24. It should be noted that a number of bowls with fiber skeins and finish for unwinding simultaneously may reach five, depending on a required number of filaments in a finished thread.

Figure 21:
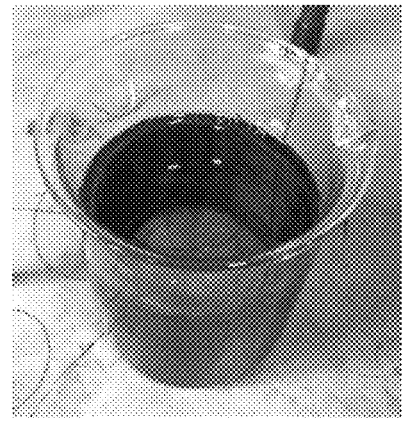
FIG. 21 shows a photo illustration of the bowl with a finish and with a β-SiC fiber bundle.

A bowl with a finish and a β-SiC fiber skein is shown in FIG. 21.

As a result, more than 100 meters of continuous length of a ready finished multifilament β-SiC were produced.

The β-SiC fiber produced was forwarded for conducting physical and chemical studies by techniques of optical microscopy, SEM, TGA, XPA (x-ray phase analysis), etc.

Microstructural and phase analysis of the β-SiC fiber. The morphology of the β-SiC fiber surface was studied by optical microscopy technique with the use of a pVizo-MET-221 metallographic microvisor of Lomo Photonica Co.™ (Russia) at hardware magnification of ×200-×500.

Figure 22:
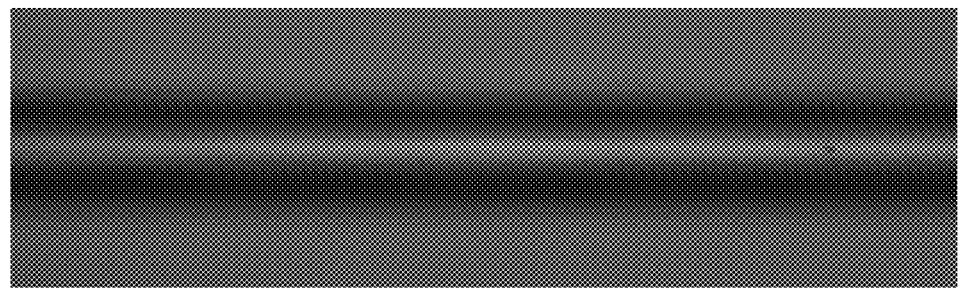
FIG. 22 and FIG. 23 show photo illustrations of the surface of a β-SiC fiber (×500 magnification).
Figure 23:
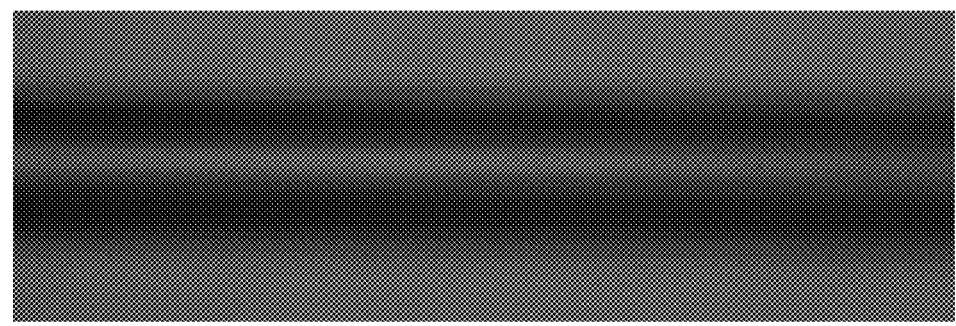
Figure 24:
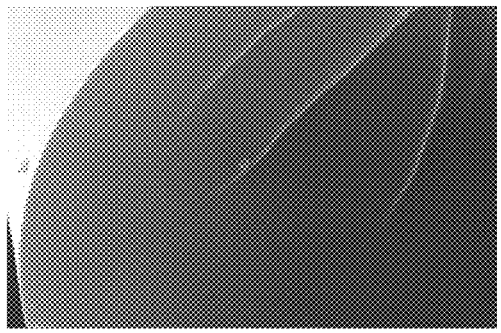
FIGS. 24-31 show microphotographic illustrations, as made by means of scanning electron microscopy (SEM) of a β-SiC fiber.
Figure 25:
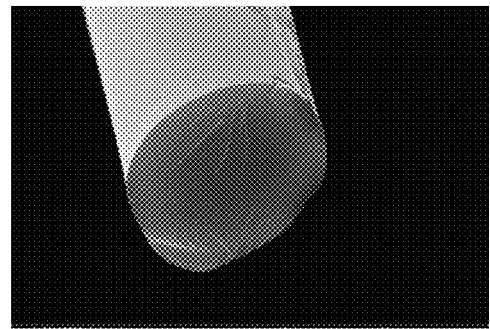
Figure 26:
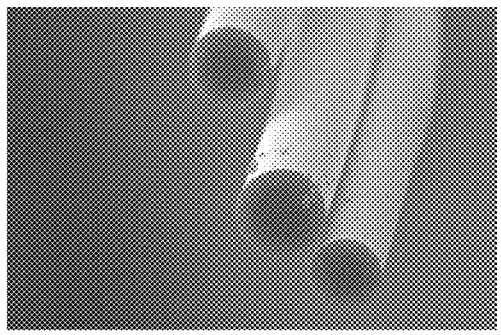
Figure 27:
Figure 28:
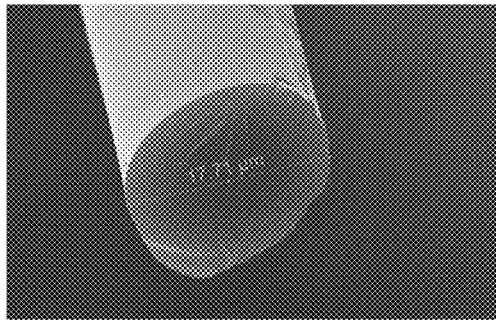
Figure 29:
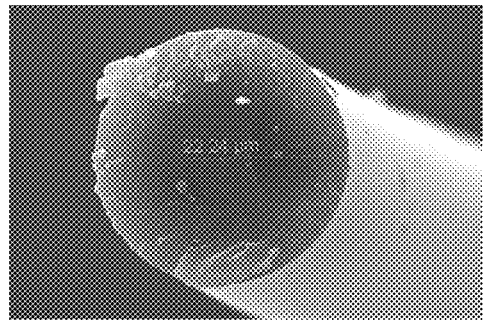
Figure 30:
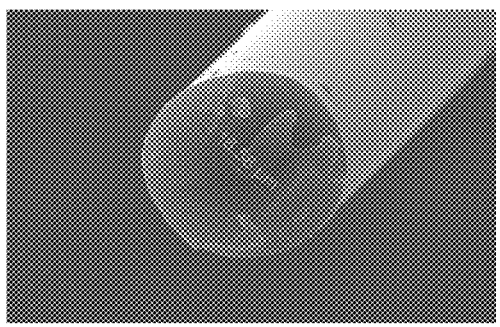
Figure 31:
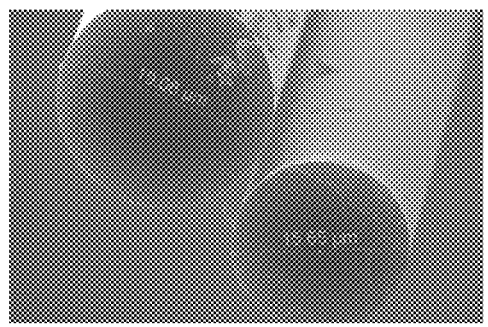

The obtained results are shown in FIGS. 22-23, where the β-SiC fiber surface can be seen (magnification ×500). The pictures show that the fibers are smooth, have no defects and have a fine-grained structure.

Further, the morphology of the β-SiC fiber surface was studied by the SEM technique. Data is shown in FIGS. 24-31.

The SEM microphotographs show that the β-SiC ceramic fibers with a diameter of 15-22 μm have a dense, fine-grained structure, and grain sizes are in the range from 16 to 30 nm.

A phase composition of the silicon carbide fibers was determined by the x-ray powder diffraction with the use of a Bruker D8 Advance Vario™ x-ray powder diffractometer equipped with a GE™ (111) monochromator (CuKa1 radiation) and a LynxEye™ position-sensitive detector.

As a result of studies, it was found that all peaks on sample diffraction patterns corresponded to the silicon carbide phase. Strong widening of peaks evidences a small size of coherent scattering areas. Particle sizes, as evaluated by the Williamson-Hall method, were 1.4-2.0 nm.

A content of oxygen, silicon, carbon and other possible impurities in the β-SiC fiber was determined by means of SEM with EDS (energy dispersion spectrum) attachment. As a result of studies, it was found that the β-SiC fibers consisted of silicon (43-56 atomic percent), carbon (31-46 atomic percent) and oxygen (8-11 atomic percent). No foreign impurities were found in the fibers and on their surface.

Also, the β-SiC fiber mechanical properties were studied.

In order to determine an average diameter of the silicon carbide fibers, a pVizo-MET-221 metallographic microvisor of Lomo Photonica Co.™ (Russia) at hardware magnification of ×200-×500 was used.

The physical and mechanical studies of the fibers were conducted by destructing a fiber experimental sample with the use of an Instron 5942 tensile-testing machine.

The Table in FIG. 32 (Sample 1) shows the characteristics of the produced β-SiC fiber batch; and FIGS. 33-34 shows samples of the silicon carbide fiber batch.

Example 2

Spinning of multifilament polymeric fiber, which is the first step of the method for producing non-core beta silicon carbide fibers, was carried out by a technique of polycarbosilane (PCS) extrusion.

Optimal processing temperatures for a PCS sample were determined in advance. As a result, the following data were obtained: softening temperature ($T_1$) 170 degrees C., initial fiber formation temperature ($T_2$) 220 degrees C. and drop temperature ($T_3$) 280 degrees C. The good filament temperature $T_{g.f.}$ (optimal spinning temperature) was selected so as to be 30 degrees C. higher than the initial fiber formation temperature −250 degrees C. Table in FIG. 3 shows temperature characteristics for Sample 2.

Then, the extruder (extrusion and spinning assembly) was switched on, and a mode of heating the operating parts was set with due regard to the optimal spinning temperature ($T_{g.f.}$) of 250 degrees C.

A schematic diagram of the extruder for spinning multifilament polymeric fibers from PCS is shown in FIG. 4; a schematic diagram of the spinneret set 9 is shown in FIG. 5; they are described in Example 1. The number of orifices in the spinneret 14 used is 48. The capacity of the gear pump 7 is 0.6 cm$^3$.

PCS was taken in the form of lumps and loaded into the bin 1 (see FIG. 4), purged with an inert gas for preventing PCS from interacting with air oxygen; the bin 1 was vacuumized by means of a vacuum pump 12.

The polymeric material was fed from the feed bin 1 to the polymer melt preparation unit heated by means of the heating elements 6 to the temperature of 250 degrees C. The polymer melt preparation unit is composed of the material cylinder 2 and the screw 3 driven via the sleeve 4 by the electric drive of the extruder 5.

When heated, PCS lumps and chips were converted into a PCS melt with viscosity of 141.0 Pa·s.

Then, the prepared PCS melt was fed to the hermetically sealed, heated fiber spinning assembly where the gear pump 7 with controllable rotation rate that was driven by the electric motor of the gear pump drive 8 forced the PCS melt to the spinneret set 9 continuously at a rate of 12 rpm and pressure of 6 MPa. The PCS melt, while being distributed over the whole surface area of the spinneret 14, was forced through all 48 orifices at a similar rate and at pressure of 1.84 MPa, which resulted in formation of a bundle of continuous fibers.

Then, stepwise cooling was carried out, followed by curing the produced fiber bundle in an inert atmosphere—gaseous nitrogen. First, cooling was carried out after the fiber bundle left the spinneret set 9 in the heated under-spinneret furnace 10 in an inert gas atmosphere, after that, in an inert gas atmosphere outside the under-spinneret furnace 10—to room temperature, and the cooled spun polymeric fiber was received by the fiber winding device 11.

The winding rate in the fiber winding device was 798 rpm, i.e. higher than the feed rate of melted polymeric fiber from the spinneret—12 rpm, in order to perform under-spinneret drawing of the fiber.

The operating speed of the handler in the fiber distributing device, which was equal to 33 rpm, enabled to alter an angle of winding fiber onto a bobbin. The receiving apparatus comprising the fiber winding device and the fiber distributing device is shown in FIG. 7.

PCS samples showed excellent spinnability, were drawn into a fine continuous filament, extrusion was carried out without pressure surges, no gas inclusions were observed in the extrudate.

As a result, a batch of PCS polymeric fibers was produced; they were brittle fibers of white color with the thickness of 25 μm.

After spinning, the fibers wound onto graphite bobbins were weighed on an analytical balance.

The Table in FIG. 10 shows the main parameters of fiber extrusion in the extrusion and spinning assembly, Sample 2.

Then, the second step of the method was carried out, namely, the polymeric fibers were subjected to thermo-chemical cross-linking—curing (oxidation) in air at the temperature of 200 degrees C., the heating rate being 6 degrees C./h.

Polymeric molecules were cross-linked due to oxidation of Si—H and Si—CH$_3$ groups and formation of new Si—O—Si and Si—O—C bonds.

The fibers obtained yellow tint, their weight was increased by 10%, on the average.

After conducting the oxidation process, the fibers wound onto graphite bobbins were weighed on an analytical balance and placed on a special bobbin carrier made of graphite. FIG. 11 shows the graphite bobbin carrier.

In order to carry out the third step of the method, the cured PCS polymeric fiber was converted into a ceramic phase, i.e. the sample was carbonized. To do this, it was treated in a high temperature vacuum furnace with stepwise heating to 1100-1300° C. in an inert atmosphere (gaseous N$_2$ and Ar).

The bobbin carrier was placed into a carbonization furnace, as shown in FIG. 12, the furnace was closed and vacuumized. Then, the furnace was filled with an inert gas, and the carbonization process of the PCS fiber was carried out with stepwise heating according to the program comprising the following steps:

Vacuumizing the furnace (to the level of 100 Pa);
Filling the furnace space with an inert gas;
Heating to 400 degrees C. at a heating rate of 2.5 degrees C./min;
Holding at 400 degrees C. (30 minutes);
Heating to 700 degrees C. at a heating rate of 4 degrees C./min;
Holding at 700 degrees C. (30 minutes);
Heating to 1250 degrees C. at a heating rate of 2.5 degrees C./min;
Holding at 1250 degrees C. (30 minutes); and
Cooling the furnace.
This program is shown in FIG. 2.

The TGA data on the oxidized fiber, proving the selection of the program temperature parameters, are shown in FIG. 13.

Photographs of the β-SiC fiber after the carbonization process are shown in FIGS. 14-19.

The formed beta silicon carbide fibers had a thickness of 15-22 μm. After carbonization, the fibers obtained black color, glossy surface, a significant shrinkage became visible (up to 25%), tints of blue and brown colors were observed.

The process of producing silicon carbide fibers in the fourth, final, step includes finishing. As the finish, a solution of polyvinyl alcohol with distilled water was taken with the concentration of 0.25%.

The finish was applied in accordance with the technique shown in FIG. 20. The technique is described in Example 1.

As a result, more than 100 meters of continuous length of a ready finished multifilament β-SiC were produced.

The produced β-SiC fiber was forwarded for conducting physical and chemical studies by techniques of optical microscopy, SEM, TGA, XPA, etc.

The studies conducted are similar to those described in Example 1. The results obtained are shown in FIGS. 22-23, where the surface of the β-SiC fiber is shown (magnification ×500)—the fibers are smooth, have no defects and have a fine-grained structure.

Data on the morphology of the β-SiC fiber surface, as obtained by the SEM technique, are shown in FIGS. 24-31. The SEM microphotographs show that the β-SiC ceramic fibers with a diameter of 15-22 μm have a dense, fine-grained structure, and grain sizes are in the range from 16 to 30 nm.

As a result of the phase composition studies it was found that all peaks on sample diffraction patterns corresponded to the silicon carbide phase. Strong widening of peaks evidences a small size of coherent scattering areas. Particle sizes, as evaluated by the Williamson-Hall method, were 1.4-2.0 nm.

A content of oxygen, silicon, carbon and other possible impurities in the β-SiC fiber was determined by means of SEM with EDS (energy dispersion spectrum) attachment. As a result of the studies, it was found that the β-SiC fibers consisted of silicon (43-56 atomic percent), carbon (31-46 atomic percent) and oxygen (8-11 atomic percent). No foreign impurities were found in the fibers and on their surface.

Also, the β-SiC fiber mechanical properties were studied. The Table in FIG. 32 (Sample 2) shows the characteristics of the produced β-SiC fiber batch; and FIGS. 33-34 shows samples of the silicon carbide fiber batch.

Example 3

Spinning of multifilament polymeric fiber, which is the first step of the method for producing non-core beta silicon carbide fibers, was carried out by extruding of polycarbosilane (PCS).

Optimal processing temperatures were determined for a PCS sample in advance. The following data was obtained: softening temperature ($T_1$) 180 degrees C., initial fiber formation temperature ($T_2$) 200 degrees C. and drop temperature ($T_3$) 290 degrees C. The good filament temperature $T_{g.f.}$ (i.e. optimal spinning temperature) was selected so as to be 40 degrees C. higher than the initial fiber formation temperature—240 degrees C. The Table in FIG. 3 shows temperature characteristics for Sample 3.

Then, the extruder (extrusion and spinning assembly) was switched on, and a mode of heating the operating parts was set with due regard to the optimal spinning temperature ($T_{g.f.}$) of 240 degrees C.

A schematic diagram of the extruder for spinning multifilament polymeric fibers from PCS is shown in FIG. 4; a schematic diagram of the spinneret set 9 is shown in FIG. 5; they are described in Example 1. The number of orifices in the spinneret 14 used was 48. The capacity of the gear pump 7 was 0.6 cm³.

PCS was taken in the form of 2-7 mm chips and loaded into the bin 1 (see FIG. 4), purged with an inert gas for preventing PCS from interacting with air oxygen; the bin 1 was vacuumized by means of the vacuum pump 12.

The polymeric material was fed from the feed bin 1 to the polymer melt preparation unit heated by means of the heating elements 6 to the temperature of 240 degrees C. The polymer melt preparation unit is composed of the material cylinder 2 and the screw 3 driven via the sleeve 4 by the electric drive of the extruder 5.

When heated, PCS was converted into a PCS melt with viscosity of 919.9 Pa·s.

Then, the prepared PCS melt was fed to the hermetically sealed, heated fiber spinning assembly where the gear pump 7 with controllable rotation rate that was driven by the electric motor of the gear pump drive 8 forced the PCS melt to the spinneret set 9 continuously at a rate of 4 rpm and pressure of 6 MPa. The PCS melt, while being distributed over the whole surface area of the spinneret 14, was forced through all 48 orifices at a similar rate and at pressure of 4.00 MPa, which resulted in formation of a bundle of continuous fibers.

Then, stepwise cooling was carried out, followed by curing the fiber bundle produced in an inert atmosphere—gaseous nitrogen. First, cooling was carried out after the fiber bundle left the spinneret set 9 in the heated under-spinneret furnace 10 in an inert gas atmosphere, after that, in an inert gas atmosphere outside the under-spinneret furnace 10—to room temperature, and the cooled spun polymeric fiber was received by the fiber winding device 11.

The winding rate in the fiber winding device was 550 rpm, i.e. higher than the feed rate of melted polymeric fiber from the spinneret—4 rpm, in order to perform under-spinneret drawing of the fiber.

The operating speed of the handler in the fiber distributing device, which was equal to 30 rpm, enabled to alter an angle of winding fiber onto a bobbin. The receiving apparatus comprising the fiber winding device and the fiber distributing device is shown in FIG. 7.

PCS samples showed excellent spinnability, were drawn into a fine continuous filament, extrusion was carried out without pressure surges, no gas inclusions were observed in the extrudate.

As a result, a batch of PCS polymeric fibers was produced; they were brittle fibers of white color with the thickness of 25 μm. After spinning, the fibers wound onto graphite bobbins were weighed on an analytical balance.

The Table in FIG. 10 shows the main parameters of fiber extrusion in the extrusion and spinning assembly, Sample 3.

Then, the second step of the method was carried out, namely, the polymeric fibers were subjected to thermochemical cross-linking—curing (oxidation) in air at the temperature of 250 degrees C., the heating rate being 10 degrees C./h.

Polymeric molecules were cross-linked due to oxidation of Si—H and Si—CH₃ groups and formation of new Si—O—Si and Si—O—C bonds.

The fibers obtained yellow tint, their weight was increased by 15%, on the average.

After conducting the oxidation process, the fibers wound onto graphite bobbins were weighed on an analytical balance and placed on a special bobbin carrier made of graphite. FIG. 11 shows the graphite bobbin carrier.

In order to carry out the third step of the method, the cured PCS polymeric fiber was converted into a ceramic phase, i.e. the sample was carbonized. To do this, it was treated in a high temperature vacuum furnace with stepwise heating to 1100-1300 degrees C. in an inert atmosphere (gaseous $N_2$ and Ar).

The bobbin carrier was placed into a carbonization furnace, as shown in FIG. 12, the furnace was closed and vacuumized. Then, the carbonization process of the PCS fiber was carried out in vacuum with stepwise heating according to the program comprising the following steps:

Vacuumizing the furnace (to the level of 100 Pa);
Filling the furnace space with an inert gas;
Heating to 400 degrees C. at a heating rate of 5 degrees C./min;
Holding at 400 degrees C. (30 minutes);
Heating to 700 degrees C. at a heating rate of 5 degrees C./min;
Holding at 700 degrees C. (30 minutes);
Heating to 1250 degrees C. at a heating rate of 5 degrees C./min;
Holding at 1250 degrees C. (30 minutes); and
Cooling the furnace.

This program is shown in FIG. 2.

The TGA data on the oxidized fiber, proving the selection of the program temperature parameters, is shown in FIG. 13.

Photographs of the β-SiC fiber after the carbonization process are shown in FIGS. 14-19.

The beta silicon carbide fibers formed had a thickness of 15-22 μm. After carbonization, the fibers obtained black color, glossy surface, a significant shrinkage became visible (up to 25%), tints of blue and brown colors were observed.

The process of producing silicon carbide fibers in the fourth, final, step includes finishing. As the finish, a solution of polyvinyl alcohol with distilled water was taken with the concentration of 0.25%.

The finish was applied in accordance with the technique shown in FIG. 20. The technique is described in Example 1.

As a result, more than 100 meters of continuous length of a ready finished multifilament β-SiC were produced.

The produced β-SiC fiber was forwarded for conducting physical and chemical studies by techniques of optical microscopy, SEM, TGA, XPA, etc.

The studies conducted are similar to those described in Example 1. The results obtained are shown in FIGS. 22-23, where the surface of the β-SiC fiber is shown (magnification ×500)—the fibers are smooth, have no defects and have a fine-grained structure.

Data on the morphology of the β-SiC fiber surface, as obtained by the SEM technique, are shown in FIGS. 24-31. The SEM microphotographs show that the β-SiC ceramic fibers with a diameter of 15-22 μm have a dense, fine-grained structure, and grain sizes are in the range from 16 to 30 nm.

As a result of the phase composition studies it was found that all peaks on sample diffraction patterns corresponded to the silicon carbide phase. Strong widening of peaks evidences a small size of coherent scattering areas. Particle sizes, as evaluated by the Williamson-Hall method, were 1.4-2.0 nm.

A content of oxygen, silicon, carbon and other possible impurities in the β-SiC fiber was determined by means of SEM with EDS (energy dispersion spectrum) attachment. As a result of the studies it was found that the β-SiC fibers consisted of silicon (43-56 atomic percent), carbon (31-46 atomic percent) and oxygen (8-11 atomic percent). No foreign impurities were found in the fibers and on their surface.

Also, the β-SiC fiber mechanical properties were studied. The Table in FIG. 32 (Sample 3) shows the characteristics of the produced β-SiC fiber batch; and FIGS. 33-34 shows samples of the silicon carbide fiber batch.

Thus, the invention provides:
the possibility of producing continuous non-core beta silicon carbide fibers,
improvement in their strength performance, in particular, improvement in tensile strength achieved due to optimal selection of spinning parameters,
improved resistance to high temperatures and high creep resistance, in particular due to oxygen content,
stability of the fiber properties,
optimal average diameter of fibers is 15-22 μm,
a simplified procedure of preparing the carbon fiber precursor used,
absence of foreign impurities in the fiber composition, namely, fibers consist of silicon—43-56 atomic percent and carbon—31-46 atomic percent and have a reduced oxygen content—8-11 atomic percent.

We claim:

1. A method for producing non-core beta silicon carbide fibers, comprising step of:
determining an initial fiber formation temperature and a drop temperature for each batch of polycarbosilane in advance, and then multifilament polymeric fiber is spun by extruding a polycarbosilane melt, for which polycarbosilane is loaded to an extruder at room temperature, heated to an optimal spinning temperature selected in the range from a temperature higher than the initial fiber formation temperature and lower than the drop temperature, for producing polycarbosilane melt, the polycarbosilane melt is forced through a spinneret at a pressure from 1.5 to 4.0 MPa for forming the polymeric fibers that are stepwise cooled in an inert atmosphere to room temperature, followed by curing, the polymeric fibers are received by a fiber winding device having a winding rate greater that a polymeric fiber feed rate, thus forming spun polymeric fibers,
carrying out thermooxidative cross-linking, for which the formed spun polymeric fibers, that are wound on graphite bobbins are cured in an oxidation furnace at a temperature in a range from 175 to 250 degrees C. at a heating rate of 3-10 degrees C./h until the spun polymeric fiber weight is increased by 6-15%, thus producing cured polymeric fiber;
carbonizing the produced cured polymeric fiber is with a conversion into ceramic phase, for which the cured polymeric fiber is treated in a furnace in an inert atmosphere or in vacuum with stepwise heating to 1100-1300 degrees C. at a heating rate 2.5-5 degrees C./min, and, the cured polymeric fiber is held at temperatures of 400, 700 and 1250 degrees C. for 30 minutes each, and then the furnace is cooled; and
finishing the produced non-core beta silicon carbide fiber using a finish.

2. The method of claim 1, wherein said polycarbosilane is synthesized from polydimethylsilane.

3. The method of claim 1, wherein said polycarbosilane is loaded to the extruder in a form of lumps or pellets having a size of 2-7 mm.

4. The method of claim 1, wherein said polycarbosilane is heated to the optimal spinning temperature selected so as to be higher than the fiber formation start temperature by 30-40 degrees C.

5. The method of claim 1, wherein gaseous nitrogen is used as the inert atmosphere.

6. The method of claim 1, wherein gaseous argon is used as the inert atmosphere.

7. The method of claim 1, wherein a polyvinyl alcohol solution with a concentration of 0.25% is used as the finish.

8. The method of claim 7, characterized in that, further comprising the step of: removing the finish, wherein the non-core beta silicon carbide fiber is washed in water having a temperature in a range from 35 to 40 degrees C. and dried at a temperature of 600 degrees C. in air for 30 minutes.

\* \* \* \* \*